Sept. 23, 1969  P. H. WINTER  3,468,395
AIR CUSHION VEHICLES WITH CENTRIFUGAL FANS PROVIDING
AIR FOR SUSTENTION AND PROPULSION
Filed Feb. 24, 1967  5 Sheets-Sheet 1

INVENTOR
PETER HERON WINTER
BY
ATTORNEYS

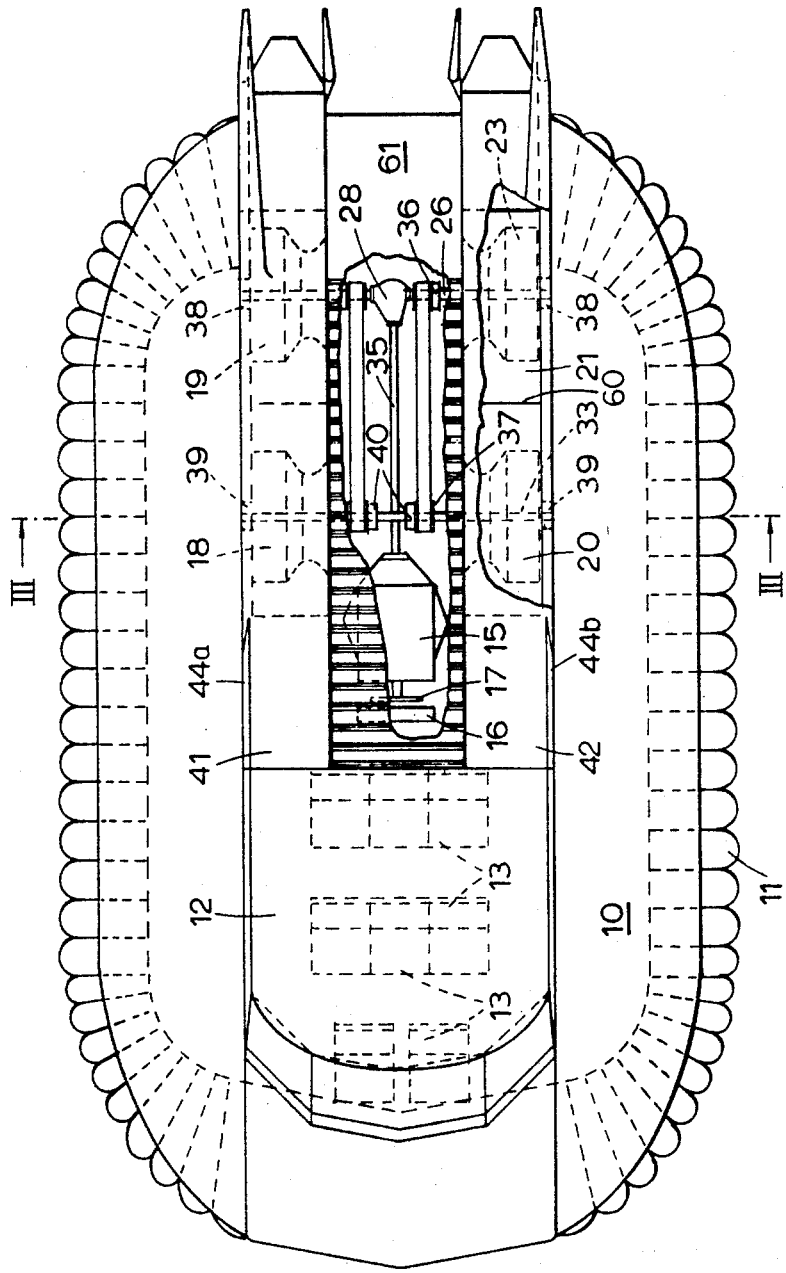

Sept. 23, 1969  P. H. WINTER  3,468,395
AIR CUSHION VEHICLES WITH CENTRIFUGAL FANS PROVIDING
AIR FOR SUSTENTION AND PROPULSION
Filed Feb. 24, 1967  5 Sheets-Sheet 3
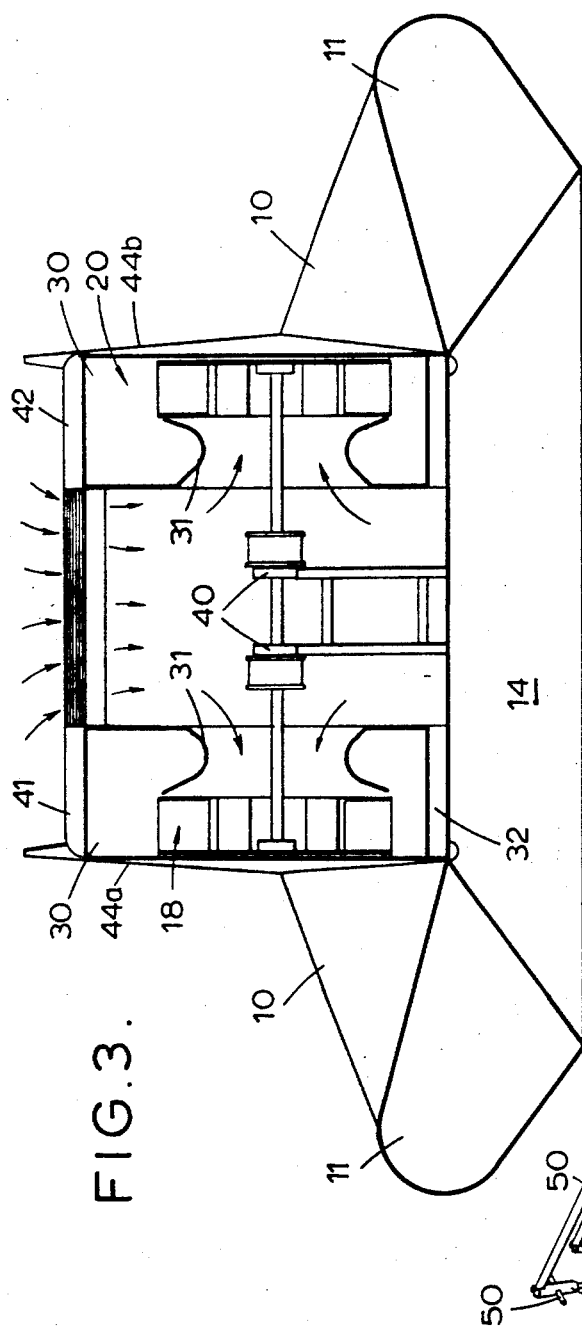
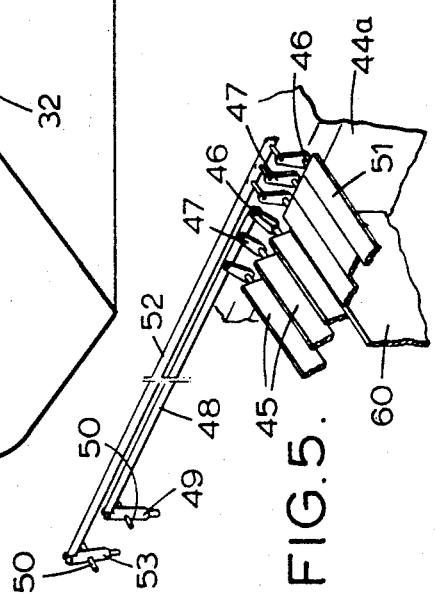
INVENTOR
PETER HERON WINTER
BY
Rackenbach & Siegel
ATTORNEYS Sept. 23, 1969 P. H. WINTER 3,468,395
AIR CUSHION VEHICLES WITH CENTRIFUGAL FANS PROVIDING
AIR FOR SUSTENTION AND PROPULSION
Filed Feb. 24, 1967 5 Sheets-Sheet 4
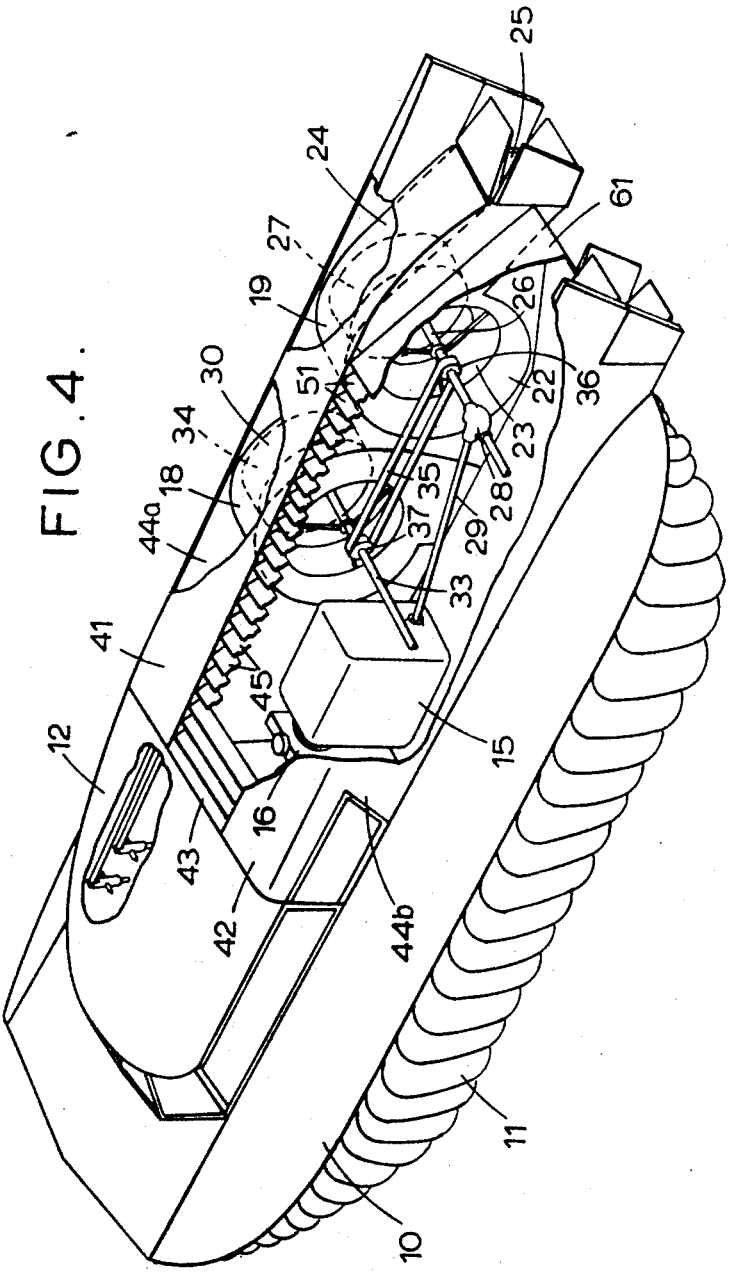
INVENTOR
PETER HERON WINTER
BY
ATTORNEYS INVENTOR
PETER HERON WINTER
BY
Rackenbach & Siegel
ATTORNEYS

United States Patent Office 3,468,395
Patented Sept. 23, 1969

3,468,395
AIR CUSHION VEHICLES WITH CENTRIFUGAL FANS PROVIDING AIR FOR SUSTENTION AND PROPULSION
Peter Heron Winter, Cowes, Isle of Wight, England, assignor to Britten-Norman Limited, St. Helens, Isle of Wight, England, a corporation of Great Britain
Filed Feb. 24, 1967, Ser. No. 618,527
Claims priority, application Great Britain, Feb. 24, 1966, 8,282/66
Int. Cl. B60v 1/00
U.S. Cl. 180—117                    7 Claims

ABSTRACT OF THE DISCLOSURE

An air cushion vehicle having at least two centrifugal fans providing pressure air and located on each side of a central chamber at the after end of the vehicle with their inlets confronting one another and drawing their air supply only from the relatively still air in the chamber, the roof of which has valves arranged to admit air into the chamber.

---

This invention relates to air cushion vehicles of the type employing centrifugal fans to provide pressure air for sustentation and propulsion. In one form of such a vehicle there are four centrifugal fans located in two banks, one on each side of the power unit of the vehicle, and at the after end of the hull. These fans have air intakes on the outboard sides of casings enclosing the fans and air is drawn in through these inlets and directed to a plenum for sustentation, and to rearwardly extending ducts for propulsion. Air cushion vehicles which have fans with air intakes on the outside of the craft suffer from poor air distribution into the fan when moving at speed owing to high air velocities over the intake lip causing the air flow to break away with consequent loss in fan efficiency. The fans themselves are also vulnerable to damage by spray, dust and debris, which can be drawn directly into the intake. It is an object of the invention to obviate these drawbacks and to provide a vehicle employing centrifugal fans with improved arrangements for the control of the air compressed and distributed, whereby the air for the fans may be drawn from a chamber of relatively slow moving air with an intake to the chamber, which can be placed remote from damage by spray, etc.

According to the invention, in an air cushion vehicle having at least two centrifugal fans arranged to provide pressure air, the fans are located on each side of a chamber at the after end of the vehicle, the inlets of the fans confronting one another and being in communication with the interior of the chamber, so that the fans draw air only from the chamber, and the upper side of the chamber spanning the space between the fans and being provided with means arranged to direct air to the chamber.

The chamber may have more than one inlet to it, arranged for convenience to avoid spray, etc. Inlets to the chamber preferably have means in the form of louvres to take advantage of the ram pressure due to forward motion and to prevent debris from being drawn into the chamber.

Conveniently the chamber may be closed at its after end, with the louvres constituting the sole inlet to the chamber.

The louvres are conveniently adjustable to permit control of the rate of admission of air to the chamber.

There may be two or more fans arranged on each side of the chamber and the output of the fans may be directed in part to provide an air cushion and in part to provide forward propulsion. Alternatively, on each side of the chamber there may be a low pressure fan to provide an air cushion and an independently driven high pressure fan to provide forward propulsion, and means to bleed the supplies of low pressure air to the air cushion if desired.

Figure 1:
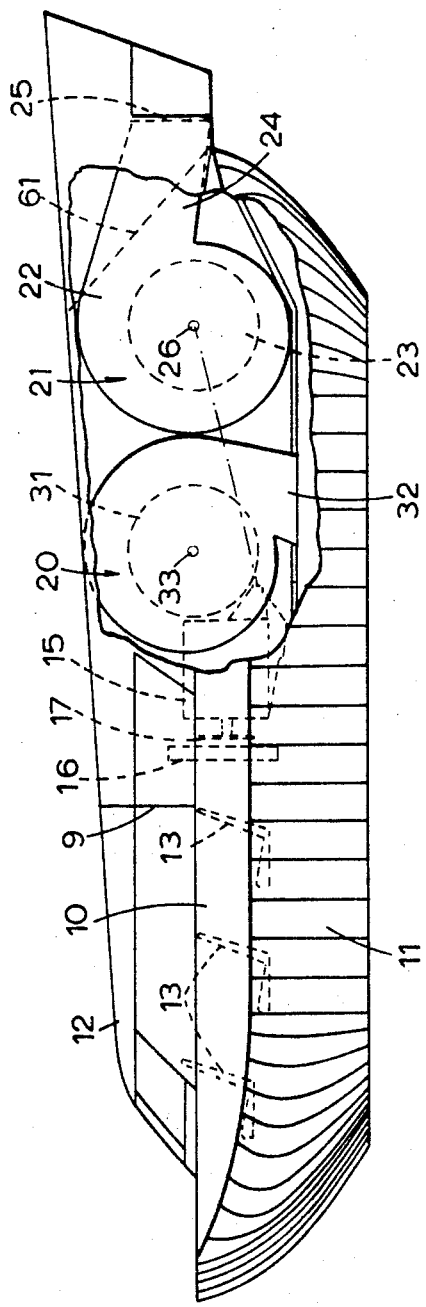
Figure 6:
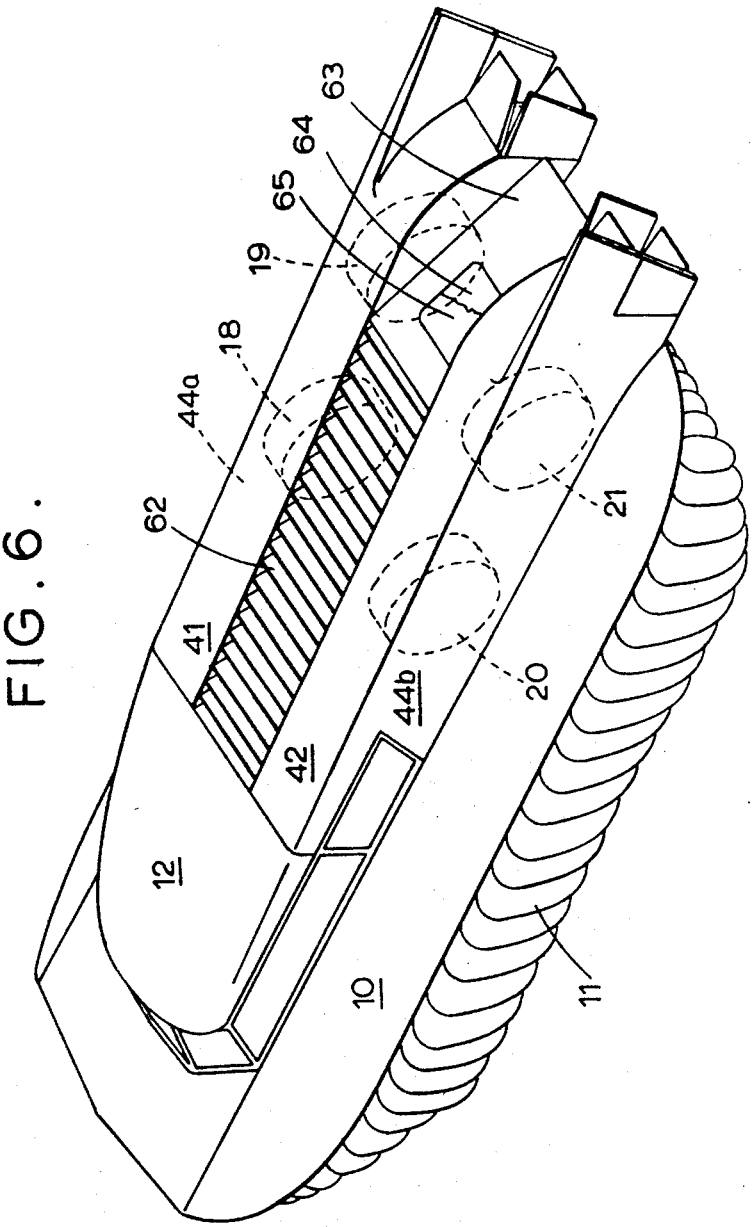

The invention will be described with reference to the accompanying drawings, in which:

FIGURE 1 is a diagrammatic side elevation of an air cushion vehicle embodying the invention, FIGURE 2 is a diagrammatic plan thereof, FIGURE 3 is a diagrammatic sectional elevation on the line III—III, FIGURE 2, FIGURE 4 is a diagrammatic three-quarter rear perspective view of the vehicle, showing parts cut away for clarity, FIGURE 5 is a fragmentary perspective view of an arrangement of movable louvres, FIGURE 6 is a perspective view of another vehicle with fixed louvres, and a rear air intake, and FIGURE 7 is a fragmentary detail view thereof.

Referring to FIGURES 1 to 5, in one embodiment of the invention a hull 10 of an air cushion vehicle is provided with a flexible skirt 11 and at the forward end of the hull there is a cabin 12 to accommodate the pilot, passengers (as indicated by seats 13) and freight. The skirt 11 illustrated is segmented, but any kind of skirt such as is well-known in the art may be employed, or there may be rigid side walls. The kind of skirt is not material to the invention. The skirt 11 encloses a plenum chamber 14. Immediately behind the cabin 12 there is located a power unit 15 on the fore-and-aft centre line of the vehicle having a radiator 16 and a fan 17 and on each side of the power unit there are two banks of centrifugal fans 18, 19, 20, 21. The forward pair of fans 18, 20 are identical but oppositely handed, and the rear pair 19, 21 are also identical but oppositely handed. It will be sufficient to describe briefly one of each pair.

A rear fan 19 or 21 has a casing 22 of volute shape formed with an inwardly facing inlet 23 and a rearwardly directed outlet duct 24 terminating in an outlet orifice 25. The fan has a transverse shaft 26, carried in journal bearings 38, on which an impeller 27 is mounted, driven through a gearbox 28 from a drive shaft 29 from the power unit 15. Pressure air for propulsion is delivered rearwardly through the outlet duct 24 and outlet orifice 25.

A forward fan 18 or 20 has a casing 30 of volute shape also formed with an inwardly facing inlet 31 and a downwardly directed outlet duct 32 which discharges pressure air into the plenum chamber 14. The fan has a transverse shaft 33 carried in journal bearings 39, 40, on which an impeller 34 is mounted. The drive for the shaft 33 is by an inverted toothed rubber belt 35 from a sprocket 36 on the shaft 26 to a sprocket 37 on the shaft 33.

Extending rearwardly from the roof and sides of the cabin 12 are substantially horizontal rigid fairings 41, 42 and vertical side walls 44a, 44b which serve to enclose the banks of fans. The fairings define a space above and to the rear of the power unit 15.

A chamber is thus formed on the hull 10, bounded by the rear wall 9 of the cabin 12, the side walls 44a, 44b the fairings 41, 42, and a rear wall 61. This chamber encloses the two banks of fans, and provides a supply of relatively still air for the inlets of the fans. There is an aperture in the roof of the chamber constituted by the space 43. This space is spanned by two series of transversely extending pivoted louvres (see FIGURE 5). The forward series of louvres 45 are located forward of a transversely extending vertical partition 60 which separates the forward fan intakes from the rear fan intakes. The louvres 45 are each pivoted at each end on a spindle 46 rotatably journalled in the adjacent fairing 41 or 42, and the spindles 46 carry lever arms 47 pin-jointedly secured to a forwardly extending control rod 48 terminating in the cabin 12 in a pilot's control 49 mounted on pivots 50 journalled in brackets (not shown) depending from the cabin roof. The forward series of louvres 45, which extend from the parition 60 to the rear wall 9 of the cabin 12, may thus be adjusted to any desired altitude by movement of the control 49.

The rear series of louvres 51 are similarly pivotally mounted and are adjustable by means of a control rod 52 and pilot's control 53.

In operation, air is drawn in through the series of louvres 45, 51, which may be adjusted to obtain the most efficient recovery of ram air pressure due to forward speed. There is thus provided a large volume of relatively still air, from which the fans draw their supply. The efficiency of the fans, particularly at high forward speed, is thereby substantially increased, and they are also protected from damage by spray, dust, debris, etc.

FIGURES 6 and 7 show another embodiment having slight modifications. The arrangement of the hull 10, skirt 11, fans 18, 19, 20, and 21 and the fairings 41 42 and side walls 44a, 44b is the same. There are, however, two different features. The louvres 62 form a single series and are not adjustable, being rigidly secured at approximately 45° to the vertical (see FIGURE 7). The rear wall 63 of the chamber is provided with an auxiliary intake 64, which may if desired be provided with an adjustable obturator 65 of any convenient form.

I claim:
1. An air cushion vehicle having a cabin at one end thereof, a generally open and unobstructed chamber at another end thereof containing sufficient volume to maintain the air therewithin relatively still, and an air cushion chamber disposed in underlying relationship to a surface of the air cushion vehicle, and being open and unobstructed over substantially the entire surface thereof, a plurality of centrifugal fans disposed within said first mentioned chamber for discharging air to the air cushion chamber to form an air cushion therein, and for discharging air rearwardly of said vehicle to provide for propulsion, said fans being located on each side of said first mentioned chamber with the inlets of the fans confronting one another and being in direct communication with the interior of said first mentioned chamber and with each other to enable them to draw air from the still air within the first mentioned chamber, said first mentioned chamber being defined by a plurality of walls and an upper side, said upper side being open to the surrounding atmosphere and having means for directing air to the first mentioned chamber.

2. An air cushion vehicle as claimed in claim 1, wherein one of the walls of the first mentioned chamber is at the after end of the air cushion vehicle, and has at least one aperture therein for enabling the admission of air into the first mentioned chamber.

3. An air cushion vehicle as claimed in claim 1, wherein the first mentioned chamber is closed at its after end and said means constitutes the sole inlet to the first mentioned chamber.

4. An air cushion vehicle as claimed in claim 1, wherein said means is adjustable to permit control of the rate of admission to the first mentioned chamber.

5. An air cushion vehicle as claimed in claim 1, wherein said plurality comprises at least two fans arranged on each side of the first mentioned chamber.

6. An air cushion vehicle as claimed in claim 1, wherein said means comprises louvers which are fixed in position and immovable with respect to the first mentioned chamber.

7. An air cushion vehicle as claimed in claim 6, wherein the first mentioned chamber is closed at its after end and the louvers constitute the sole means for directing air into the first mentioned chamber.

References Cited
UNITED STATES PATENTS

| | | | |
|---|---|---|---|
| 1,907,160 | 5/1933 | Schauman | 180—117 |
| 3,181,637 | 5/1965 | Cockerell | 180—130 |

A. HARRY LEVY, Primary Examiner